United States Patent Office 3,462,296
Patented Aug. 19, 1969

3,462,296
FLUORINATED OIL- AND WATER-REPELLENT COPOLYMER AND PROCESS FOR TREATING FIBROUS MATERIALS WITH SAID COPOLYMER
Stuart Raynolds, Wilmington, and Thomas K. Tandy, Jr., Newark, Del., assignors to E. I. du Pont de Nemours and Company, Wilmington, Del., a corporation of Delaware
No Drawing. Continuation-in-part of application Ser. No. 567,077, July 22, 1966. This application Apr. 27, 1967, Ser. No. 634,083
Int. Cl. D06m 1/02
U.S. Cl. 117—161   21 Claims

ABSTRACT OF THE DISCLOSURE

An oil- and water-repellent polymer of $$R_f CH_2 CH_2 O_2 CC(CH_3)=CH_2$$

where $R_f$ is perfluoroalkyl, 2-ethylhexylmethacrylate, $RCH(OH)CH_2O_2CCR'=CH_2$ where R and R' are hydrogen or methyl, and, optionally, N-methylolacrylamide, all in specified proportions.

An oil- and water-repellent mixture of polymers comprising the above polymer and a polymer of a vinylidine monomer or a conjugated diene, in specified proportions.

Process of treating fabric materials with either of the above compositions by applying an aqueous emulsion of the polymer or mixture of polymers to the fabric under selected conditions.

The preparation of the polymer of the first paragraph by free radical initiation of aqueous emulsion of the monomers.

CROSS-REFERENCES TO RELATED APPLICATION

This application is a continuation-in-part of application Ser. No. 567,077 filed July 22, 1966, now abandoned.

BACKGROUND OF THE INVENTION

Field of the invention

This invention concerns new oil- and water-repellent compositions for application to textiles and their preparation.

Description of the prior art

Fasick and Raynolds, U.S. Patent 3,282,905, disclose the monomers $CH_2=C(CH_3)CO_2CH_2CH_2R_f$ and, in general, polymers and copolymers of these monomers, $R_f$ being a perfluoroalkyl group of three to 14 carbons. Fasick, Johnson and Raynolds, French Patent 1,327,328 and first addition 84,578 have disclosed the application of polymers and copolymers of the above fluorinated monomers as mixtures with vinylidene polymers and other optional adjuvants to textiles to obtain high oil and water repellency. The formulations disclosed by Fasick, Johnson and Raynolds have considerable utility as evidenced by the substantial commercial success presently enjoyed by these products.

However, there exists a need to improve these products, especially with respect to their durability or resistance to washout on the fabric, their tolerance to surfactants, and their curing conditions. It is well known, for example, that repeated laundering and dry cleaning of fabric materials tends to wash out or remove the many treating agents applied to textiles. The present invention is directed to this need for a more durable oil- and water-repellent composition.

SUMMARY OF THE INVENTION

The present invention is directed to an oil and water repellent comprising a fluoropolymer prepared by aqueous emulsion polymerization under free radical initiation conditions. The fluoropolymer is an interpolymer prepared from a monomer mixture comprising (a) from about 70% to about 95% by weight of at least one monomer of the formula $R_f CH_2 CH_2 O_2 CC(CH_3)=CH_2$, wherein $R_f$ is a perfluoroalkyl group of four to fourteen carbons, (b) from about 5% to about 30% by weight of 2-ethylhexyl methacrylate, (c) from about 0.1% to about 1% by weight of $RCH(OH)CH_2O_2CCR'=CH_2$, wherein R and R' are each selected from the group consisting of hydrogen and methyl, and (d) from 0% to about 0.5% by weight of N-methylolacrylamide.

Thus the novel fluoropolymer interpolymer comprises about 70% to about 95% by weight of units derived from at least one monomer of the formula $$CH_2=C(CH_3)CO_2CH_2CH_2R_f$$

about 5% to about 30% by weight of units derived from 2-ethylhexyl methacrylate, about 0.1% to about 1% by weight of units derived from $RCH(OH)CH_2O_2CR'=CH_2$, and about 0% to about 0.5% of units derived from N-methylolacrylamide.

The present invention is also directed to an oil- and water-repellent mixture of polymers comprising (a) the interpolymer described in the preceding paragraph, and (b) a polymer of at least one monomer selected from (1) a polymerizable vinylidene compound free of nonvinylic fluorine or (2) a conjugated diene. These mixtures of fluorinated polymers and vinylidene polymers contain from about 3% to about 60% by weight of the component $CH_2=C(CH_3)CO_2CH_2CH_2R_f$ in polymerized form, with 40% to 50% being preferred. Since the fluorinated polymer itself contains from 70% to 95% of $CH_2=C(CH_3)CO_2CH_2CH_2R_f$ in polymerized form, sufficient vinylidene polymer is added to bring the concentration of polymerized $CH_2=C(CH_3)CO_2CH_2CH_2R_f$ in the range of 3% to 60%.

The present invention is further directed to the process of treating fibrous materials with an aqueous emulsion of the fluoropolymer interpolymer or the mixture of polymers, described above, in sufficient amounts to effect a dry pickup on the fiber of about 0.1% to about 10% of the polymeric compositions by weight of the fiber, drying the treated fibrous material and heating it from about 66° C. to about 195° C. for at least 15 seconds.

The present invention is still further directed to aqueous emulsions of the fluoropolymer interpolymer and to aqueous emulsions of the mixture of polymers.

DESCRIPTION OF THE INVENTION

The interpolymer $R_f$ is further defined as a straight chain perfluoroalkyl group of 4–14 carbons and preferably of 6–10 carbons, and is represented by perfluorobutyl, perfluorohexyl, perfluorodecyl, perfluorotetradecyl, and the like.

In $RCH(OH)CH_2O_2CCR'=CH_2$, each of R and R' is H or $CH_3$. Thus $RCH(OH)CH_2O_2CCR'=CH_2$, as defined, encompasses four compounds, namely 2-hydroxyethyl acrylate, 2-hydroxyethyl methacrylate, 2-hydroxypropyl acrylate and 2-hydroxypropyl methacrylate. Of these, 2-hydroxyethyl methacrylate is preferred. It is preferred to use equiweight mixtures of 2-hydroethyl methacrylate and N-methylolacrylamide.

The Fasick and Raynolds patent, referred to above, discloses the preparation of the monomers $$R_f CH_2 CH_2 O_2 CC(CH_3)=CH_2$$

where $n$ is from four to 14 as individual species and where $n$ is predominantly 6, 8 and 10 in the weight ratio 3:2:1. This latter mixture is the preferred fluoromonomer for use in this invention.

A preferred fluoropolymer of this inventoin contains about 75% by weight of the above preferred fluoromonomer mixture where $n$ is 6, 8 and 10 in the ratio 3:2:1, about 25% by weight of 2-ethylhexyl methacrylate and 0.25% by weight of each of 2-hydroxyethyl methacrylate and N-methylolacrylamide.

Another preferred fluoropolymer of this invention contains about 85% by weight of the above preferred fluoromonomer mixture, about 15% by weight of 2-ethylhexyl methacrylate and 0.25% by weight of each of 2-hydroxyethyl methacrylate and N-methylolacrylamide.

The preferred fluoropolymers of this invention have inherent viscosities of from about 0.1 to about 1.2 as 0.5% solutions in 1,1,2-trichloro-1,2,2-trifluoroethane at 30° C. Inherent viscosity is defined by the formula $$V_i = \frac{1}{C} \ln \left[\frac{V}{V_o}\right]$$

where $V_i$ is the inherent viscosity, C is the concentration of polymer in grams per 100 ml. of solution, V is the viscosity of the solution, $V_o$ is the viscosity of the solvent and $1n$ is the natural logarithm. The inherent viscosity of the polymer is controlled by adding chain transfer agents such as dodecyl mercaptan to the polymerization reactions as will be more fully discussed hereinafter.

If either less than 5% or more than 30% of 2-ethylhexyl methacrylate is incorporated in the fluorinated polymer, inferior oil repellency results are obtained. The third component, $RCH(OH)CH_2O_2CCR'=CH_2$, as described above, or mixtures thereof with N-methylolacrylamide, is present mainly to impart durability to the polymer. The more durable the polymer is the more resistant the fluoropolymer is to washing out which normally occurs during laundering and dry cleaning of the treated textiles. If less than 0.1% is present, poor durability is obtained; if more than about 1% is present, other performance properties of the oil and water repellent are adversely affected.

The fluorinated polymers of this invention must be prepared by aqueous emulsion polymerization using free radical initiation. Any known system for aqueous emulsion polymerization of water insoluble methacrylate esters may be used. In general, any free radical initiator may be used such as organic or inorganic peroxides or organic aliphatic azo compounds. Broadly, either cationic or anionic emulsifying agents may be used in the polymerization but nonionic agents are generally avoided. The cationic agents are preferred, particularly salts of long chain tertiary alkyl amines.

A preferred method for preparing the fluorinated polymers of this invention involves preemulsification of the water insoluble $R_fCH_2CH_2O_2CC(CH_3)=CH_2$ and 2-ethyl-hexyl methacrylate monomers, using dimethyloctadecylamine acetate as the dispersing agent, and then combining this emulsion with a water solution of the water soluble monomers, azo initiator and a mercaptan chain modifier, preferably dodecyl mercaptan. From 0.03% to 0.1% by weight, on total weight of monomers of dodecyl mercaptan is used. The preferred initiator is azo bis(isobutyramidine)dihydrochloride. The total monomer content in the preferred aqueous emulsion polymerization process is about 25% by weight.

The polymerization temperature, which naturally varies with the initiator being used, may vary from 40° C. to as high as 130° C. if autogeneous pressure is used. The preferred azo catalyst above requires about 65° C. Higher temperatures can be attained using inorganic peroxides such as potassium persulfate, peroxyanhydrides such as benzoyl peroxide, peroxy esters, such as tert-butyl perbenzoate or ditertiaryalkyl peroxides such as ditert-butyl peroxide.

When the fluorinated polymer contains more than 80% of $R_fCH_2CH_2O_2CC(CH_3)=CH_2$, it is preferred to use a different polymerization system, an aqueous dispersion polymerization system. This process is identical to that described in the previous paragraphs except that a water insoluble azo initiator, preferably azo bis(isobutyronitrile), is used. Polymerization temperatures and times are essentially the same as for the earlier process. While preferred for polymers containing more than 80% of the fluorinated monomer, this process may be used to prepare any of the fluorinated polymers of this invention.

The mixture of polymers

The term vinylidene monomer in its broadest sense, as used herein, includes any polymerizable monomer containing the group $CH_2=C<$, the polymerizable vinyl monomers, containing the group $CH_2=CH-$, being a subgroup of the vinylidene monomers. The term polymerizable vinylidene monomer, as used herein, also includes polymerizable molecules containing more than one polymerizable function where these functions do not coact and hence polymerize separately. Conjugated dienes are included separately because the two polymerizable functions in conjugated dienes coact and polymerize as a single unit.

In most cases, the polymer derived from the vinylidene monomers need not be crosslinked. Under some circumstances of use, however, where vinylidene polymers are used which are not crosslinked, pad roll buildup occurs, particularly if high temperatures, say, greater than 120° F., are used during application of the polymer mixture to textiles. In such cases, a crosslinked vinylidene polymer is more desirable. This is most readily accomplished by inclusion of a small amount, say, from 0.001% to 10% by weight of a nonconjugated diene in the vinylidene polymer such as ethylene dimethacrylate.

For purposes of obtaining durability to laundering and dry cleaning, it is usually desirable to include a small amount in the vinylidene polymer of a monomer such as 2-hydroxyethyl or 2-hydroxypropyl methacrylate or acrylate, N-methylolacrylamide or methacrylamide or the glycidyl acrylate or methacrylates.

The polymerizable vinylidene compounds free of non-vinylic fluorine which may be used in this invention include alkyl acrylates and methacrylates, vinyl esters of aliphatic acids, styrene and alkyl styrenes, vinyl halides, vinylidene halides, allyl esters, vinyl alkyl ketones, certain acrylamides and 1,3-butadiene and its derivatives. Representative examples include the alkyl acrylates and alkyl methacrylates where the alkyl group is methyl, propyl, butyl, isoamyl, 2-ethylhexyl, octyl, decyl, lauryl, cetyl, and octadecyl. Other representative examples of the polymerizable vinylidene compound are vinyl acetate, vinyl propionate, vinyl caprylate, vinyl laurate, vinyl stearate, styrene, α-methylstyrene, p-methylstyrene, vinyl fluoride, vinyl chloride, vinyl bromide, vinylidene fluoride, vinylidene chloride, allyl heptanoate, allyl acetate, allyl caprylate, allyl caproate, vinyl methyl ketone and vinyl ethyl ketone. Representative examples of the conjugated diene include 1,3-butadiene, 2-chloro-1,3-butadiene, 2,3-dichloro-1,3-butadiene and isoprene.

The preferred vinylidene monomer class of the above groups is the alkyl methacrylates, such as n-butyl, n-amyl, n-hexyl, isoamyl, 2-ethylhexyl, n-heptyl and n-octyl methacrylates. Styrene, 2,3-dichloro-1,3-butadiene and alkyl acrylates are also quite useful in the present invention, but generally less preferable than the methacrylates. Of this group, 2-ethylhexyl methacrylate is particularly preferred.

The nonconjugated dienes used to crosslink the vinylidene polymers when necessary for certain applications contain two polymerizable vinylidene groups which cannot polymerize together as a unit such as occurs in conjugated dienes such as 1,3-butadiene. These nonconjugated compounds may be acrylic type esters of alkanediols, divinyl esters of alkanedioic acids, vinyl esters of acrylic type acids, allylic esters of acrylic type acids, divinyl substituted aromatic compounds and similar related compounds. Representative examples of the acrylic type esters of alkanediols include the diacrylates and dimethacrylates of the following diols: ethylene glycol, 1,3-propylene glycol, tetramethylene glycol, pentamethylene glycol, hexamethylene glycol, decamethylene glycol, and diethylene glycol. Representative examples of useful divinyl esters of alkanedioic acids are divinyl succinate, divinyl adipate, and divinyl suberate. Examples of useful divinyl aromatic compounds are divinyl benzene, divinyl toluene. Useful vinyl esters and allylic esters of acrylic type acids include vinyl acrylate and vinyl methacrylate, vinyl α-chloroacrylate and allyl acrylate and allyl methacrylate. These divinyl monomers provide crosslinking in the vinylidene copolymer. The crosslinking seems to prevent formation of the gummy mass in high-temperature application previously described. Of the above group, ethylene dimethacrylate is the preferred nonconjugated diene compound.

The preferred vinylidene polymer contains about 98% 2-ethylhexyl methacrylate and about 2% N-methylolacrylamide. The preferred crosslinked vinylidene polymer contains about 97.5% 2-ethylhexyl methacrylate, about 2% N-methylolacrylamide and about 0.5% ethylene dimethacrylate.

The vinylidene polymers are readily prepared as aqueous emulsions, using the same general procedures used to prepare the fluorinated polymers, as described above. The polymer mixtures are then obtained by mixing the proper amounts of each emulsion. The resulting may be further diluted as desired.

The only problem which could arise with mixing of such emulsions is if the emulsifying agents used to prepare the fluorinated polymer emulsion and the vinylidene polymer emulsion are not compatible. In particular, it is not usually wise to mix anionic and cationic emulsifying agents. The preferred emulsifying agent for preparing the vinylidene polymer emulsion, like that of the fluorinated polymer, is dimethyloctadecylamine acetate.

The treatment of fabrics

For use in oil and water repellent formulation, the polymer emulsions obtained by the above procedures are usually used directly in the pad bath without isolation of the interpolymer or mixture of polymers.

The compositions are applied preferably as an aqueous dispersion by brushing, dipping, spraying, padding, roll-coating or by any combination of these methods. For example, the prepared concentrated dispersion of polymer composition may be used as a pad bath by diluting it with water to a solids content of 0.1% to 10% by weight of the bath. The textile material, or paper, if desired, is padded in this bath, and is then freed of excess liquid, usually by squeeze rolls, so that the dry pickup (weight of the dry polymer on fiber) is between about 0.1% and 10% by weight of the fiber. The treated material is then dried and heated at 66° C. to 195° C., preferably 120° C. to 195° C., for at least about 15 seconds to impart maximum repellency to the material. The resulting textile material or paper will be found to be resistant to water and oil, and the textile material will retain its resistance to such agents even after many launderings and dry cleanings.

It is common practice in the textile industry to treat fabrics with several agents at the same time. These agents may include softeners, crease resistance agents, wetting agents, antistatic agents, resin finishes and the like. Many of these agents tend to dilute the vinylidene polymer portion of the present polymer composition with materials which are inert as oil and water repellents. In such cases, better results are obtained if higher concentrations of $CH_2=C(CH_3)CO_2CH_2CH_2R_f$ in polymerized form are used than when the oil- and water-repellent compositions of this invention are used alone. When other adjuvants are not used, about 25% by weight of the polymerized $R_fCH_2CH_2O_2CC(CH_3)=CH_2$ gives useful results. When other adjuvants are used, higher concentrations are needed, but about 60% is the practical upper limit. About 40% to 50% by weight of $R_fCH_2CH_2O_2CC(CH_3)=CH_2$ is prefered in most cases where other adjuvants are used, particularly from a value in use viewpoint.

Suitable substrates for the application of the compositions of this invention are films, fibers, yarns, fabrics, and articles made from filaments, fibers, or yarns derived from natural, modified natural, or synthetic polymeric materials or from blends of these other fibrous materials and other porous materials which will absorb and transport low surface tension liquids either on their surfaces or in their interstices by capillary action. Specific representative examples are cotton, silk, regenerated cellulose, nylon, fiber-forming linear polyesters, fiber-forming polyacrylonitrile, cellulose nitrate, cellulose acetate, ethyl cellulose, paper, fiberglass, wood pressed or otherwise hardened wood composites, metals, unglazed porcelain, porous concrete and the like. Dyed and undyed cotton sateen, poplin, broadcloth, jean cloth, gabardine and the like are especially adaptable for treatment with the compositions of this invention to provide products having a high repellency to oil and water and which are also relatively unaffected by the action of heat, air and light. Materials rendered oil and water repellent by the invention polymer compositions retain a high portion of the original repellency after laundering and dry cleaning.

In some applications of the oil- and water-repellant composition of this invention, the vinylidene polymer is not necessary as, for example, when treating upholstery fabrics, leather or leather substitutes where durability, especially to dry cleaning is not important or necessary. In such cases, the fluorinated polymer alone is applied as an aqueous emulsion in the same manner as described above for the mixed polymeric compositions. When applying to leather or leather substitutes, brushing, dipping or spraying may be used, but padding or roll-coating would not be applicable. Useful oil and water repellency is obtained but durability, especially to dry cleaning, should not be expected. The amounts of fluorinated polymer used are essentially the same as the polymeric compositions, 0.1% to 10% by weight. Curing is the same as used with the polymeric compositions, providing, of course, that curing temperatures are adjusted to meet the capabilities of the substrate.

The examples

Representative examples of the present invention follow. All parts are by weight unless specified otherwise.

The fluorinated monomer is, in every case, of the structure $F(CF_2)_nCH_2CH_2O_2CC(CH_3)=CH_2$, wherein $n$ is 6, 8 and 10 in the weight ratio of 3:2:1 with a small amount, less than 10% by weight, of $n=12$ and 14. These monomers were prepared by following the procedure of Example 2 of the Fasick and Raynolds Patent 3,282,905, using in place of $CF_3CF_3CF_2CH_2CH_2OH$, as described therein, a mixture of alcohols $F(CF_2)_nCH_2CH_2OH$, having the values of $n$ described above, prepared by the processes of Parsons, U.S. Patent 3,234,294 and British Patent 994,607. Alternatively, the fluorinated esters could be prepared by the method of Fasick, U.S. Patent 3,239,557.

The following Examples 1 to 7 are representative of the prepartion of the fluorinated polymer and vinylidene polymers of the present invention.

Example 1

To 118 parts water at 50° C. to 55° C. was added a preformed mixture of 11.8 parts dimethyloctadecylamine and 7.1 parts acetic acid. Then, after mixing is complete, 150 parts $F(CF_2)_nCH_2CH_2O_2CC(CH_3)=CH_2$ and 50 parts commercial 2-ethylhexyl methacrylate were added. The resulting mixture is passed twice through a Manton-Gaulin homogenizer at 3000 p.s.i.g.

The resulting emulsion of monomers is purged with nitrogen for one hour, then added to 200 parts air-free deionized water along with 66 parts of water rinse. Then 0.503 part commercial 2-hydroxyethyl methacrylate, 0.840 part of a 60% by weight aqueous solution of N-methylolacrylamide and from 0.088 to 0.165 part dodecyl mercaptan were added. After the resulting mixture was heated at 65° C. for 0.5 hour, a mixture of 0.08 part azo bis(isobutyramidine)dihydrochloride in 0.25 part water was added to initiate the polymerization. The temperature was allowed to adjust to 70° C. and the reaction mass was maintained for four hours with agitation. The mass is then cooled to ambient temperature, giving an emulsion containing about 25% by weight polymer, the polymer being approximately 75% by weight $F(CF_2)_nCH_2CH_2O_2CC(CH_3)=CH_2$ units, 25% 2-ethylhexyl methacrylate units, 0.25% 2-hydroxyethyl methacrylate units and 0.25% N-methylolacrylamide units.

Example 2.—Non-fluorinated vinylidene polymer—non-crosslinked

This procedure does not involve the pre-emulsification of monomers as described in Example 1. The aqueous emulsion polymerization of this example was run at 70° C. for four hours, using the following recipe added in the order shown:

| | Parts |
|---|---|
| Demineralized water | 2200 |
| Octadecyldimethylamine | 20 |
| Acetic acid | 12.2 |
| 2-ethylhexyl methacrylate | 1000 |
| Acetone | 237 |
| Sodium chloride | 0.7 |
| 60% N-methylolacrylamide | 18 |
| Azo bis(isobutyramidine)dihydrochloride | 0.222 |

Approximately a 30% emulsion of a polymer containing 98% 2-ethylhexyl methacrylate and 2% N-methylolacrylamide results.

Example 3

(A) Fluorinated polymer.—This procedure does not involve the pre-emulsification of monomers as described in Example 1. The polymerization was run at 60° C. for 6 hours with the following recipe added in the order shown:

| | Parts |
|---|---|
| Water | 2200.0 |
| Dimethyloctadecylamine | 30.0 |
| Glacial acetic acid | 18.3 |
| $F(CF_2)_nCH_2CH_2O_2CC(CH_3)=CH_2$ | 750.0 |
| 2-ethylhexyl methacrylate | 250.0 |
| N-methylolacrylamide | 2.5 |
| 2-hydroxyethyl methacrylate | 2.5 |
| Acetone | 1000.0 |
| Azodiisobutyramidine dihydrochloride | 0.4 |

The polymer was essentially identical to that of Example 1.

(B) Nonfluorinated vinylidene polymer—crosslinked.—The polymerization was run at 70° C. for four hours with the following recipe added in the order shown:

| | Parts |
|---|---|
| Water | 2200.0 |
| Dimethyloctadecylamine | 20.0 |
| Glacial acetic acid | 12.2 |
| 2-ethylhexyl methacrylate | 950.0 |
| N-methylolacrylamide | 18.0 |
| Ethylene dimethacrylate | 5.0 |
| Acetone | 237.0 |
| Sodium chloride | 0.7 |
| Azobisisobutyramidine dihydrochloride | 0.222 |

The product was an emulsion of the polymer in water, essentially identical to that of Example 2.

Example 4

Example 3B was repeated to prepare similar crosslinked vinylidene polymers, except that the following materials were used in place of the 5.0 parts ethylene dimethacrylate:

| Amount charged: | Diene in polymer percent by weight |
|---|---|
| 1.0 part ethylene dimethacrylate | 0.1 |
| 2.0 parts ethylene dimethacrylate | 0.2 |
| 3.4 parts ethylene dimethacrylate | 0.35 |
| 0.29 part ethylene dimethacrylate | 0.03 |
| 25.0 parts ethylene dimethacrylate | 0.25 |
| 100.0 parts ethylene dimethacrylate | 10.0 |
| 1.0 part divinylbenzene | 0.1 |
| 10.0 parts divinylbenzene | 1.0 |
| 50.0 parts divinylbenzene | 5.0 |
| 100.0 parts divinylbenzene | 10.0 |
| 1.0 part propylene dimethacrylate | 0.1 |
| 10.0 parts propylene dimethacrylate | 1.0 |
| 100.0 parts propylene dimethacrylate | 10.0 |
| 1.0 part pentylene dimethacrylate | 0.1 |
| 10.0 parts pentylene dimethacrylate | 1.0 |
| 100.0 parts pentylene dimethacrylate | 10.0 |
| 1.0 part vinyl acrylate | 0.1 |
| 10.0 parts vinyl acrylate | 1.0 |
| 100.0 parts vinyl acrylate | 10.0 |
| 1.0 part allyl acrylate | 0.1 |
| 10.0 parts allyl acrylate | 1.0 |
| 100.0 parts allyl acrylate | 10.0 |

Example 5

Fluorinated polymers were prepared using the same procedure as in Example 1 except that the 2-ethylhexyl methacrylate was replaced with an equivalent amount of the following monomers.

(A) Methyl methacrylate
(B) n-Propyl methacrylate
(C) n-Butyl methacrylate
(D) 2-ethylbutyl methacrylate
(E) n-Amyl methacrylate
(F) n-Hexyl methacrylate
(G) 2-butoxyethyl methacrylate
(H) n-Octyl methacrylate
(I) n-Decyl methacrylate.

In each case, the product was an emulsion of the polymer in water, similar in nature to the polymer obtained in Example 1.

Example 6

Six fluorinated polymers were prepared using the procedure and the fluorinated monomer and 2-ethylhexyl methacrylate of Example 1. However, the third monomer was replaced by the third monomer listed in Table I below.

TABLE I

| Polymer number: | Fluoro monomer | 2-ethyl-hexyl methacrylate | Third monomer |
|---|---|---|---|
| | [Relative Amounts in Parts] | | |
| 6-1 | 75 | 25 | $HOCH_2CH_2O_2CCH=CH_2$, 0.25 / $HOCH_2NHCOCH=CH_2$, 0.25 |
| 6-2 | 75 | 25 | $HOCH_2CH_2O_2CCH=CH_2$, 0.5 / $HOCH_2NHCOCH=CH_2$, 0.5 |
| 6-3 | 75 | 25 | $CH_3CH(OH)CH_2O_2CCH=CH_2$, 0.25 |
| 6-4 | 75 | 25 | $CH_3CH(OH)CH_2O_2CCH=CH_2$, 0.5 |
| 6-5 | 75 | 25 | $CH_3CH(OH)CH_2O_2CCH=CH_2$, 0.25 / $HOCH_2NHCOCH=CH_2$, 0.25 |
| 6-6 | 75 | 25 | $CH_2CH(OH)CH_2O_2CCH=CH_2$, 0.5 / $HOCH_2NHCOCH=CH_2$, 0.5 |

In each case, the product was an aqueous polymer emulsion similar in nature to that obtained in Example 1.

Example 7

Four polymers were prepared using the same procedure, fluorinated monomer, and 2-ethylhexyl methacrylate monomer as used in Example 1. However, the third monomer was replaced by the monomer lister in Table II below.

TABLE II

| Polymer number: | Fluoro monomer | 2-ethyl-hexyl methacrylate | Third monomer |
|---|---|---|---|
|  | [Relative Amounts in Parts] | | |
| 7-1 | 75 | 25 | HOCH$_2$CH$_2$O$_2$CC(CH$_3$)=CH$_2$, 0.5 |
| 7-2 | 75 | 25 | HOCH$_2$CH$_2$O$_2$CC(CH$_3$)=CH$_2$, 0.25 |
| 7-3 | 75 | 25 | HOCH$_2$CH$_2$O$_2$CCH=CH$_2$, 0.25 |
| 7-4 | 75 | 25 | CH$_3$CHOHCH$_2$O$_2$CC(CH$_3$)=CH$_2$, 0.25 |

In each case, the product was an aqueous polymer emulsion similar in nature to that obtained in Example 1.

The following examples demonstrate the oil and water repellency of the compositions of the present invention. Two pad baths (A and B) were prepared having the formulations shown below. Textiles were padded with these baths and the wet pickup was controlled to give the concentrations on fabric shown below by adjustment of the squeeze rolls. The fabrics were then dried at 340° F. and cured for two minutes at 340° F. by techniques well known to those skilled in the art.

Formulation A (Component):        Wt. percent, OWF [1]
  Water repellent A [2] _____ 1.8
  Catalyst 1 [2] _____ 0.13
  Synthrapol KB [2] _____ 0.028
  Softener ND [2] _____ 0.83
  Quabond VH4 [2] _____ 1.1
  Aerotex resin 44 [2] _____ 7.3
  Magnesium chloride _____ 1.1
  Oil/water repellent (as indicated in the examples).

Formulation B (Component):        Wt. percent, OWF [1]
  Water repellent B [2] _____ 0.42
  Catalyst 1 [2] _____ 0.105
  Methylolstearamide _____ 0.34
  Triton-W-30 [2] _____ 0.025
  Aerotex 23 special [2] _____ 3.4
  Aerotex resin MW [2] _____ 0.67
  Catalyst 101 [2] _____ 0.75
  Buffer DCY [2] _____ 0.20
  Oil/water repellent (as indicated).

Footnotes to Formulations A and B:
  [1] OWF=On weight of fabric.
  [2] Water Repellent A—A 27% active ingredient dispersion of solids, the solids being 46% paraffin wax, 46% reaction product of hexamethoxymethylmelamine with 3 moles commercial behenic acid, 4% dimethyloctadecylamine acetate, 4% dimethyltetradecylamine acetate.
  Catalyst 1, Catalyst RB—2 parts aluminum glycollate+one part glycollic acid.
  Synthrapol KB—A nonionic surfactant, the ethylene oxide condensate of tridecyl alcohol (manufactured by Imperial Chemical Industries).
  Softener ND—Polyethylene dispersion-softener.
  Quabond VH4—A 25% polyvinyl acetate emulsion.
  Aerotex Resin 44—A crease resistance-wash/wear resin of the melamine type (manufactured by American Cyanamid Co.).
  Water Repellent B—A composition of 25% paraffin wax, 75% reaction product of hexamethoxymethylmelamine+3 moles stearic acid+1 mole triethanolamine+acetic acid, as described in U.S. Patent 2,783,231.
  Triton-W-30—An alkyl aryl ether wetting agent (manufactured by Rohm & Haas Co.).
  Aerotex 23 Special—A wash/wear resin of triazine-formaldehyde condensate (manufactured by American Cyanamid Co.).
  Aerotex Resin MW—Crease resistant resin, modified melamineformaldehyde condensate (manufactured by American Cyanamid Co.).
  Catalyst 101—Buffered zinc nitrate, 28% solids.
  Buffer DCY—An organic nitrogen compound (manufactured and sold by American Cyanamid Co.).

The oil and water repellencies were evaluated using the methods described below.

The fabric samples were tested for water repellency using A.A.T.C.C. Standard Test Method 22–1952 of the American Association of Textile Chemists and Colourists. A rating of 100 denotes no water penetration or surface adhesion; a rating of 90 denotes slight random sticking or wetting, and so on.

The oil-repellency test comprises placing a drop of test solution carefully on the textile on a flat horizontal surface. After three minutes, any penetration or wicking into the fabric is noted visually. To aid in the observation, the test solutions contained a small amount of oil-soluble blue dye to increase visibility. The nature of the test solutions is shown below; Nujol, of course, is a purified petroleum oil. Anything with a rating of 5 or greater is good or excellent; anything with a rating of 2 or over can be used only for certain purposes. As an example, if a treated fabric repels the No. 2–6 solutions, but not the No. 7 solution, its rating is 6. If Nujol penetrates, the rating is zero.

| Oil-Repellency Rating: | Test solution | Surface tension, dynes/cm. at 25° C. |
|---|---|---|
| 9 | n-Heptane | 20.0 |
| 8 | n-Octane | 21.8 |
| 7 | n-Decane | 23.5 |
| 6 | n-Dodecane | 25.0 |
| 5 | n-Tetradecane | 26.7 |
| 4 | 50-50, hexadecane/Nujol | 28.7 |
| 3 | 25-75, hexadecane/Nujol | 30.3 |
| 2 | Nujol | 31.2 |

After the oil and water repellency ratings were determined, a portion of each treated fabric sample was given three standard washings and oil and water repellency ratings were again determined. A standard washing consists of agitating the treated fabric for 40 minutes at 60° C. to 100° C. in water containing 0.1% by weight of a neutral chip soap +0.05% soda ash, rinsing with 60° C. water three times, spin drying, then pressing on each face at 300° F. ±20° F. for 30 seconds. A portion of each treated fabric sample was also given three standard dry cleanings and the oil and water repellency ratings were again determined. A standard dry cleaning consists of agitating the treated fabric for 20 minutes in tetrachloroethylene containing 2% commercial dry cleaning detergent (R. R. Street Company) and 0.5% water. The fabrics were then dried by first centrifuging for one minute followed by drying for five minutes in a tumble dryer at 160° F. The fabrics were then pressed 15 seconds on each face at 300° F. ±20° F.

Example 8

The oil and water repellencies and results obtained using various fluorinated polymers in Formulations A and B are shown below in Table III. The following comments apply to all: (1) All oil and water repellents were 13.5% active ingredient emulsions of solids, the solids being mixtures of fluorinated and vinylidene polymers in a ratio containing 40% by weight polymerized fluorinated monomer, 60% by weight other monomers. In all cases, the vinylidene polymer was that of Example 3 containing 0.5% ethylene dimethacrylate. In all cases, the A formulations were applied to Fabric 127, a pigmented dyed cotton poplin, manufactured by Dan River Mills. Fabric 127 was selected since, due to the weave of this fabric and the fact that it is pigmented, high oil repellencies are difficult to obtain. The B formulations were applied to Fabric 112, a 65/35 "Dacron" polyester-cotton poplin, manufactured by Fairforest Mills. This fabric was selected for testing since good water repellency is difficult to obtain on this fabric.

TABLE III

| Fluorinated polymer | Weight percent OWF[1] | Formulation | Results oil repellency | Formulation | Results oil/water repellency |
|---|---|---|---|---|---|
| Example 1 | 0.27 | A | 6 | B | 8/100 |
| Example 5A | 0.27 | A | 3 | B | 0/70+ |
| Example 5B | 0.27 | A | 3 | B | 0/100 |
| Example 5C[2] | 0.27 | A | 3-4 | B | 2/100 |
| Example 5D | 0.27 | A | 4 | B | 2/100 |
| Example 5E | 0.27 | A | 4-5 | B | 4/100 |
| Example 5F[3] | 0.27 | A | 4-5 | B | 0/100 |
| Exampel 5G | 0.27 | A | 6-7 | B | 7/80+ |
| Example 5H | 0.27 | A | 4 | B | 2/100 |
| Example 5I | 0.27 | A | 4 | B | 6/100 |

[1] On weight of fabric, weight percent of mixture of fluorinated and vinylidene polymers in weight ratio described earlier.
[2] Fluorinated polymers containing sec.-butyl or isoamyl methacrylates in place of the n-butyl methacrylate of this test gave equivalent results.
[3] Fluorinated polymers containing ethyl or isobutyl methacrylates gave equivalent results.

As can be seen from the above Table III, the oil- and water-repellent composition of this invention (Example 1) gives surprising oil repellency on Fabric 127. None of the other fluorinated oil and water repellent polymers gave high oil repellency except Example 5G which contained 2-butoxyethyl methacrylate, and this polymer gave poor water repellency on Fabric 112. With regard to Fabric 112 it should be noted that the fabric treated with the composition of the present invention gave high oil and water repellency in comparison to the other fluorinated polymers.

Example 9

Samples of Fabric 127 were treated in the manner described in Example 8 with the following A formulations:

Formulation I was prepared containing 0.338% OWF of a mixture of the fluorinated polymer of Example 1 and vinylidene polymer of Example 3 containing 0.5% ethylene dimethacrylate. The polymer mixture contained 40% by weight polymerized fluorinated monomer.

Formulation II was prepared, identical to that above except that the fluorinated polymer, prepared by the procedure of Example 1, did not contain any N-methylolacrylamide or 2-hydroxyethyl methacrylate.

Formulation III was also prepared containing 0.338% OWF of a mixture of a fluorinated polymer consisting of 97.5% of the fluorinated monomer of Example 1, 2% n-butyl acrylate and 0.5% N-methylolacrylamide (prepared by the procedure of Example 1 of Netherlands Publication 6,510,472) and the vinylidene polymer of Example 3 containing 0.5% ethylene dimethacrylate. The mixture contained 40% by weight polymerized fluorinated monomer.

Formulation IV was prepared, identical to Formulation I except that the fluorinated polymer, prepared using the procedure of Example 1, contained about 75% of the fluorinated monomer of Example 1, about 25% 2-ethylhexyl methacrylate and 0.5% N-methylolacrylamide.

Samples of Fabric 112 were treated with Formulation B having the polymer mixture described above in Formulations I, II, III, and IV. These tests were designated as B-I, B-II, B-III, and B-IV.

The Fabrics 112 and 127, treated with the above-described formulations, were evaluated for oil and water repellency, initially and after three standard launderings and drycleanings, with the results shown in Table IV.

TABLE IV

| | | Results, oil and water repellency | | | | | |
|---|---|---|---|---|---|---|---|
| | | Initial | | 3 SL[1] | | 3 SD[2] | |
| | Fabric | Oil | Water | Oil | Water | Oil | Water |
| Formulation: | | | | | | | |
| A-I | 127 | 7 | 100 | 4 | 70 | 5 | 70 |
| A-II | 127 | 8 | 100 | 4 | 70 | 0 | 50 |
| A-III | 127 | 0 | 80 | 0 | 70 | 0 | 50 |
| A-IV | 127 | 5 | 100 | 5 | 70+ | 0 | 70 |
| B-I | 112 | 7 | 100 | 7 | 100 | 7 | 70+ |
| B-II | 112 | 8 | 100 | 7 | 80 | 0 | 50 |
| B-III | 112 | 7 | 100 | 7 | 100 | 6 | 70 |
| B-IV | 112 | 7 | 100 | 7 | 100 | 4 | 70 |

[1] 3 SL = After 3 standard launderings.
[2] 3 SD = After 3 standard drycleanings.

From the above results, it can be seen that the polymers of Formulations II, III, and IV, which did not contain the third component monomer of this invention, i.e., the hydroxyalkyl acrylate or methacrylate alone or combined with N-methylolacrylamide, are less durable oil and water repellents, especially with regard to drycleaning.

Example 10

Formulations A-I and A-III above were applied to Fabric 127 and Formulations B-I and B-III to Fabric 112, using the procedure of Example 8 except that a variety of curing temperatures were used at two minutes curing time as shown in Table V. The initial oil and water repellencies were averaged for Formulations A-I and B-I, and A-III+B-III at each curing temperature, with the results shown in Table V below.

TABLE V

| | Water repellency/oil repellency formulations | |
|---|---|---|
| | A-I+B-I | A-III+B-III |
| Curing temp., ° F., 2 mins.: | | |
| 150 | 50+/4 | 50+/2 |
| 200 | 70+/5 | 70/3 |
| 250 | 80+/6 | 80/5 |
| 300 | 90/7 | 90/6 |
| 340 | 90+/7 | 90/6 |

Example 11

Example 1 was repeated using varying amounts of the chain transfer agent dodecyl mercaptan. The resulting fluoropolymers were converted to Formulations A-I and B-I, as described in Example 9. The A-I formulations were applied to Fabric 127 and the B-I formulations to Fabric 112 as described in Example 9, and the resulting fabrics evaluated as shown in Table VI below.

TABLE VI

| Fluorinated Polymer | | Formulation A, Fabric 127 | | Formulation B, Fabric 112 | |
|---|---|---|---|---|---|
| Percent dodecyl mercaptan[1] | Inherent viscosity[2] | Oil | Water | Oil | Water |
| 0 | ([3]) | 4 | 70+ | 7 | 100 |
| 0.01 | 1.77 | 4 | 80 | 8 | 90 |
| 0.03 | 1.10 | 6 | 90 | 7 | 100 |
| 0.10 | 0.46 | 6 | 100 | 8 | 100 |
| 0.30 | 0.19 | 4 | 90 | 5 | 100 |
| 1.0 | 0.09 | 4 | 80 | 4 | 80+ |

[1] Percent by weight of total monomer weight.
[2] As 0.5% solutions at 30° C. in 1,1,2-trichloro-1,2,2-trifluoroethane.
[3] Insoluble in solvent.

From the above table, it can be seen that fluorinated polymers having inherent viscosities between 0.1 and 1.2 give the best over-all oil and water repellencies.

Example 12

Two aqueous dispersions were prepared containing 13.5% solids. In Dispersion I, the solids consisted of the fluorinated polymer of Example 1 and the vinylidene polymer of Example 2. This polymer mixture contained 40% by weight of polymerized fluorinated monomer and represents the oil- and water-repellent composition of this invention.

In the same manner, Dispersion II was prepared, identical to Dispersion I except that an equivalent amount (40% polymerized fluorinated monomer in mixture) of the fluorinated polymer used to prepare Formulation III of Example 9 was used.

With these two dispersions, the two formulations shown below were prepared.

| Formulation (component) | Weight percent OWB [1] | |
|---|---|---|
| | C | D |
| Water repellent A [1] | 5.5 | 5.5 |
| $C_{18}H_{37}N\begin{matrix}(CH_2CH_2O)_xH\\ \cdot HCl\\ (CH_2CH_2O)_yH\end{matrix}$ $x+y=15$. | 0.018 | 0.018 |
| Dispersion I | | 5.5 |
| Dispersion II | 5.5 | |
| "Aerotex" 23 Special [1] | 6.5 | 6.5 |
| "Wicaset" EC [1] | 3.0 | 3.0 |
| "Cellusoft" P [1] | 3.0 | 3.0 |
| Buffer DCY [1] | 0.4 | 0.4 |
| Zinc nitrate | 1.0 | 1.0 |

[1] Water Repellent A, "Aerotex" 23 Special and Buffer DCY have been identified hereinabove.
OWB, on total weight of bath.
"Wicaset" EC is a polyvinyl acetate emulsion textile finish, Wica Chemicals, Inc.
"Cellusoft" P is a nonionic pure polyethylene emulsion free of wax and nitrogen, textile softener, Synthron, Inc.

These formulations were applied to various pigment printed cotton fabrics containing various amounts of pigment. Application was by a single dip and nip to give 60% wet pickup, with drying at 240° F. and curing at 345° F. for two minutes. The results are shown below in Table VII.

TABLE VII

| Pigment | Pigment concentration, percent | Oil repellency formulation | |
|---|---|---|---|
| | | C | D |
| Blue 1 | 5 | 5 | 7 |
| | 15 | 2- | 7 |
| | 30 | 0 | 6 |
| Blue 2 | 5 | 8 | 8 |
| | 15 | 7 | 8 |
| | 30 | 7 | 7+ |
| Blue 3 | 5 | 7 | 7+ |
| | 15 | 4 | 7 |
| | 30 | 0 | 7 |
| Brown 1 | 5 | 7 | 7 |
| | 15 | 4 | 7 |
| | 30 | 0 | 6 |
| Brown 2 | 5 | 8 | 8 |
| | 15 | 7 | 8 |
| | 30 | 7 | 7+ |
| Brown 3 | 5 | 7+ | 7 |
| | 15 | 5 | 7 |
| | 30 | 2+ | 7 |
| White background | | 8 | 8 |
| Water repellency (colored and uncolored) | | 100 | 100 |

From the above results, it can be seen that Formulation D, which contains the fluorinated polymer of this invention, gives improved oil repellency on pigmented fabrics in comparison to the fluorinated polymer of Formulation C consisting of 97.5% fluorinated monomer, 2% n-butyl acrylate and 0.5% N-methylolacrylamide.

Example 13

The following four formulations were prepared:
E–I—Formulation A containing 0.144% by weight OWF of the polymer of Example 1, added as a 7.2% aqueous dispersion.
E–II—Formulation A containing 0.180% OWF of the polymer of Example 1, added as a 7.2% aqueous dispersion.
E–III—Formulation B containing 0.144% OWF of the polymer of Example 1, added as a 7.2 aqueous dispersion.
E–IV—Formulation B containing 0.180% OWF of the polymer of Example 1, added as a 7.2 aqueous dispersion.

Formulations E–I and E–II were applied to Fabric 127 and Formulations E–III and E–IV to Fabric 112 as described in the discussion preceding Example 8. The results are shown below.

| | Repellencies | |
|---|---|---|
| | Initial | |
| | Oil | Water |
| Formulation: | | |
| E–I | 5 | 90 |
| E–II | 6 | 100 |
| E–III | 7 | 100 |
| E–IV | 7 | 100 |

From the above results, it can be seen that the fluorinated polymer by itself gives good oil and water repellency and can be used without the vinylidene polymer where durability to laundering and drycleaning is not important.

Example 14

Each of the six polymers of Example 6 was mixed with the vinylidene polymer of Example 3B in proportions such that the polymer mixture contained 40% fluorinated monomer in polymerized form. Each mixture was then incorporated in Formulation B at two concentrations. Each Formulation B was applied to Fabric 112, a vat-dyed tan 65/35 "Dacron" polyester/cotton poplin, Style No. 1035, manufactured by Fairforest Mills. The oil and water repellency results are shown below in Table VIII.

TABLE VIII

| | Concentration, percent OWB | Repellencies | | | | | |
|---|---|---|---|---|---|---|---|
| | | Initial | | 3 SL | | 3 SDC | |
| | | Oil | Water | Oil | Water | Oil | Water |
| Polymer No.: | | | | | | | |
| 6–1 | 0.270 | 8 | 100 | 8 | 100 | 7 | 70 |
| | 0.338 | 8 | 100 | 8 | 100 | 7 | 70 |
| 6–2 | 0.270 | 8 | 100 | 7 | 100 | 7 | 70 |
| | 0.338 | 9 | 90+ | 8 | 100 | 7 | 70 |
| 6–3 | 0.270 | 8 | 100 | 8 | 100 | 7 | 70 |
| | 0.338 | 8 | 100 | 8 | 100 | 7 | 70 |
| 6–4 | 0.270 | 8 | 100 | 8 | 100 | 7 | 70 |
| | 0.338 | 8 | 100 | 8 | 100 | 7 | 70+ |
| 6–5 | 0.270 | 9 | 100 | 8 | 100 | 7 | 70 |
| | 0.338 | 8 | 100 | 8 | 100 | 7 | 70+ |
| 6–6 | 0.270 | 8 | 100 | 7 | 100 | 7 | 70 |
| | 0.338 | 8 | 100 | 8 | 100 | 7 | 70+ |

EXAMPLE 15

Each of the polymers designated as 7–1 and 7–2 of Example 7 was mixed with the vinylidene polymer of Example 3B in proportions such that the polymer mixture contained 40% fluorinated monomer in polymerized form. Each mixture was then incorporated in Formulations A and B at two concentrations. Each Formulation A was applied to Fabric 127 (described in Example 8) and each Formulation B to Fabric 112 (described in Example 14). The results are shown below in Table IX.

TABLE IX

| | Concentration, percent OWF | Formulation | Repellencies | | | | | |
|---|---|---|---|---|---|---|---|---|
| | | | Initial | | 3 SL | | 3 SDC | |
| | | | Oil | Water | Oil | Water | Oil | Water |
| Polymer No.: | | | | | | | | |
| 7–1 | 0.270 | A | 4 | 80 | 4 | 70 | 4 | 70+ |
| | 0.338 | A | 4 | 80 | 4 | 70 | 4 | 70+ |
| | 0.270 | B | 6 | 100 | 6 | 100 | 5 | 70+ |
| | 0.338 | B | 7 | 100 | 6 | 100 | 7 | 70+ |
| 7–2 | 0.270 | A | 5 | 80 | 4 | 70+ | 2 | 70+ |
| | 0.338 | A | 6 | 80+ | 0 | 70+ | 3 | 70+ |
| | 0.270 | B | 7 | 100 | 7 | 80 | 6 | 70+ |
| | 0.338 | B | 6 | 100 | 7 | 100 | 6 | 70+ |

Example 16

Using the general procedure of Example 1, 15.6 parts dimethyloctadecylamine and 9 parts acetic acid were mixed with 122 parts water. When mixing was complete, 187 parts $F(CF_2)_nCH_2CH_2O_2CC(CH_3)=CH_2$ and 33 parts 2-ethylhexyl methacrylate were added and the resulting mixture was homogenized as before. The resulting dispersion was divided into aliquots, each containing 50 parts of monomer mixture. One aliquot was selected for further polymerization. The resulting dispersion was diluted with 184 parts water, purged with nitrogen as described in Example 1 and was then added to a reaction vessel containing 65 parts water with stirring. To the resulting mixture was added 0.12 part 2-hydroxyethyl methacrylate, 0.19 part of 60% aqueous N-methylol acrylamide and 0.024 part dodecylmercaptan. The mixture was repurged, brought to 65° C. and 0.02 part azo bis(isobutyronitrile) was added. The resulting mixture was stirred for four hours at 70° C. The resulting polymer contained 85% fluorinated monomer, 15% 2-ethylhexyl methacrylate and 0.25% of each of 2-hydroxyethyl methacrylate and N-methylol acrylamide. It was obtained as a 26.1% A.I. dispersion. The polymer had an inherent viscosity of 0.58, measured as before.

Example 17

Example 16 was repeated identically except that 0.24 part 2-hydroxyethyl methacrylate and 0.38 part 60% aqueous N-methylol acrylamide. The resulting polymer then contained 0.5% of each of these two monomers, the remaining two being the same. The product was a 25.6% A.I. dispersion and the polymer had an inherent viscosity of 0.71 measured as before.

Example 18

Example 16 was repeated with adjustments in the weights of $F(CF_2)_nCH_2CH_2O_2CC(CH_3)=CH_2$ and 2-ethylhexyl methacrylate to give polymers containing the following percentages; all contained 0.25% of each of 2-hydroxyethyl methacrylate and 0.25% N-methylol acrylamide as before.

|  | Percent $F(CF_2)_nCH_2CH_2O_2CC(CH_3)=CH_2$ | Percent 2-ethylhexyl methacrylate |
|---|---|---|
| Polymer: |  |  |
| A | 95 | 5 |
| B | 90 | 10 |
| C | 80 | 20 |

Example 19

The emulsions of Example 16 and Examples 18A–C were combined with the emulsion of Example 2 to give a 13.5% A.I. dispersion wherein 40% of the total solids was a fluorinated monomer, such as described in Example 8. The formulations below were prepared and applied to fabric 112 and 407 cotton poplin as earlier described at 50% wet pickup using the earlier described procedure. The results are shown below in Table X.

In testing oil repellency, two systems were used, that described earlier and a system wherein the test oil samples contain a blue dye and are allowed to remain on the fabric for 3 minutes before the rating is determined. This is a much more severe test than the other.

The test oils and corresponding numbers for this "three minuted dyed oil" test are as follows:

3 MINUTE DYED OIL

Oil repellency

| rating: | Test solution |
|---|---|
| 8 | n-Heptane. |
| 7 | n-Octane. |
| 6 | n-Decane. |
| 5 | n-Dodecane. |
| 4 | n-Tetradecane. |
| 3 | n-Hexadecane. |
| 2 | 65/35—Nujol/n-hexadecane. |
| 1 | Nujol. |

Note that the solutions for rating 1 and 4–8 are the same as the earlier described test, the numbers here being one unit lower. Solutions 2 and 3 are not the same as those for ratings 3 and 4 in the other system. These test solutions are the same as those used in AATCC Test Method 118–1966T but the AATCC Test does not call for dye and uses a 30 second rating.

FORMULATION F

| Component | Wt. Percent OWF |
|---|---|
| Water Repellent A [2] | 2.0 |
| Aerotex 23 Special [2] | 5.0 |
| $MgCl_2$ | 0.5 |
| $C_{18}H_{37}N\begin{array}{c}(CH_2CH_2O)_xH\\(CH_2CH_2O)_yH\end{array}\cdot HCl$ | [3] |
| Oil/water repellent (13.5% A.I. dispersion) |  |

[1] and [2] see footnotes, formulations A and B.
[3] 1.74% on weight of oil/water repellent as indicated.

FORMULATION G

Same as formulation F except 0.8% water repellent B (2) used in place of 2.0% water repellent A.

TABLE X

| Formula | Oil/water repellent | | Initial | | | 3SL | | | 1SDC | | |
|---|---|---|---|---|---|---|---|---|---|---|---|
| | Fluorinated polymer | Percent OWF | Oil Reg. | 3 MD | Water | Oil Reg. | 3 MD | Water | Oil Reg. | 3 MD | Water |
| Fabric, 112: | | | | | | | | | | | |
| F | 18A | 1.5 | 4 | 2 | 100 | 3 | 1 | 80 | 4 | 2 | 80 |
| | | 2.0 | 6 | 2 | 100 | 4 | 2 | 80 | 6 | 2 | 80 |
| | | 2.5 | 6 | 4 | 100 | 4 | 2 | 90 | 6 | 3 | 80 |
| F | 18B | 1.5 | 5 | 2 | 100 | 4 | 1 | 80 | 4 | 2 | 70 |
| | | 2.0 | 7 | 4 | 100 | 4 | 2 | 80 | 5 | 3 | 80 |
| | | 2.5 | 7 | 5 | 100 | 6 | 3 | 80 | 6 | 3 | 70 |
| F | 16 | 1.5 | 5 | 2 | 100 | 4 | 2 | 80 | 4 | 2 | 80 |
| | | 2.0 | 7 | 4 | 100 | 5 | 2 | 100 | 4 | 2 | 70 |
| | | 2.5 | 7 | 5 | 100 | 7 | 4 | 90 | 7 | 4 | 80 |
| F | 18C | 1.5 | 5 | 2 | 100 | 4 | 2 | 80 | 4 | 2 | 70 |
| | | 2.0 | 7 | 4 | 100 | 6 | 3 | 80 | 6 | 3 | 80 |
| | | 2.5 | 7 | 5 | 100 | 6 | 4 | 80 | 6 | 4 | 80 |
| G | 18A | 1.5 | 6 | 3 | 90 | 5 | 4 | 80 | 6 | 3 | 70 |
| | | 2.0 | 6 | 5 | 100 | 7 | 5 | 90 | 7 | 4 | 70 |
| | | 2.5 | 7 | 6 | 100 | 7 | 6 | 100 | 7 | 6 | 80 |
| G | 18B | 1.5 | 6 | 4 | 100 | 6 | 3 | 80 | 4 | 3 | 70 |
| | | 2.0 | 7 | 5 | 100 | 7 | 5 | 90 | 7 | 5 | 70 |
| | | 2.5 | 7 | 6 | 100 | 7 | 5 | 100 | 6 | 5 | 70 |
| G | 16 | 1.5 | 7 | 4 | 100 | 7 | 3 | 100 | 5 | 3 | 70 |
| | | 2.0 | 7 | 6 | 100 | 7 | 5 | 100 | 7 | 4 | 70 |
| | | 2.5 | 7 | 7 | 100 | 7 | 6 | 100 | 7 | 6 | 80 |

TABLE X—Continued

| Formula | Oil/water repellent | | Repellencies | | | | | | | | |
|---|---|---|---|---|---|---|---|---|---|---|---|
| | | | Initial | | | 3SL | | | 1SDC | | |
| | Fluorinated polymer | Percent OWF | Oil | | Water | Oil | | Water | Oil | | Water |
| | | | Reg. | 3 MD | | Reg. | 3 MD | | Reg. | 3 MD | |
| G | 18C | 1.5 | 7 | 3 | 100 | 7 | 4 | 90 | 5 | 3 | 70 |
| | | 2.0 | 7 | 5 | 100 | 7 | 6 | 90 | 7 | 5 | 70 |
| | | 2.5 | 7 | 6 | 100 | 7 | 6 | 100 | 7 | 5 | 70 |
| 407 Poplin: | | | | | | | | | | | |
| F | 18A | 1.5 | 7 | 1 | 100 | 6 | 1 | 80 | 7 | 1 | 80 |
| | | 2.0 | 8 | 2 | 100 | 7 | 1 | 80 | 7 | 2 | 80 |
| | | 2.5 | 8 | 2 | 100 | 7 | 2 | 90 | 8 | 2 | 90 |
| F | 18B | 1.5 | 8 | 1 | 100 | 7 | 1 | 80 | 8 | 2 | 80 |
| | | 2.0 | 8 | 2 | 100 | 7 | 1 | 80 | 8 | 2 | 80 |
| | | 2.5 | 8 | 2 | 100 | 7 | 2 | 80 | 8 | 2 | 80 |
| F | 16 | 1.5 | 8 | 2 | 100 | 7 | 1 | 80 | 8 | 1 | 80 |
| | | 2.0 | 8 | 2 | 100 | 7 | 1 | 80 | 8 | 2 | 80 |
| | | 2.5 | 8 | 3 | 100 | 7 | 2 | 80 | 8 | 3 | 80 |
| F | 18C | 1.5 | 7 | 1 | 100 | 7 | 1 | 80 | 8 | 1 | 70 |
| | | 2.0 | 7 | 2 | 100 | 6 | 2 | 80 | 8 | 2 | 80 |
| | | 2.5 | 8 | 3 | 100 | 7 | 2 | 80 | 8 | 4 | 80 |
| G | 18A | 1.5 | 7 | 2 | 80 | 7 | 2 | 70 | 8 | 1 | 70 |
| | | 2.0 | 8 | 2 | 100 | 8 | 2 | 80 | 8 | 2 | 70 |
| | | 2.5 | 8 | 4 | 100 | 8 | 3 | 80 | 9 | 3 | 70 |
| G | 18B | 1.5 | 9 | 2 | 90 | 8 | 2 | 70 | 8 | 2 | 70 |
| | | 2.0 | 8 | 3 | 80 | 8 | 3 | 70 | 8 | 2 | 70 |
| | | 2.5 | 8 | 3 | 100 | 8 | 3 | 80 | 8 | 2 | 70 |
| G | 16 | 1.5 | 8 | 2 | 100 | 8 | 2 | 70 | 7 | 2 | 70 |
| | | 2.0 | 8 | 3 | 100 | 8 | 3 | 90 | 8 | 2 | 70 |
| | | 2.5 | 8 | 5 | 100 | 8 | 4 | 90 | 8 | 5 | 80 |
| G | 18C | 1.5 | 8 | 2 | 100 | 8 | 2 | 80 | 7 | 2 | 70 |
| | | 2.0 | 8 | 3 | 100 | 8 | 2 | 80 | 8 | 2 | 70 |
| | | 2.5 | 8 | 4 | 100 | 8 | 5 | 80 | 8 | 3 | 70 |

It is to be understood that the preceding examples are representative and that said examples may be varied within the scope of the total specification, as understood by one skilled in the art, to produce essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An interpolymer comprising
   (a) from about 70% to about 95% by weight of units derived from at least one monomer of the formula $R_fCH_2CH_2O_2CC(CH_3)=CH_2$, wherein $R_f$ is a perfluoroalkyl group of from four to fourteen carbon atoms;
   (b) from about 5% to about 30% by weight of units derived from the monomer 2-ethylhexyl methacrylate;
   (c) from about 0.1% to about 1% by weight of units derived from the monomer $$RCH(OH)CH_2O_2CC(R')=CH_2$$

wherein R and R' are each selected from the group consisting of hydrogen and methyl; and
   (d) from 0% to about 0.5% by weight of units derived from the monomer N-methylolacrylamide;
   and wherein the total weight percent of the components of the interpolymer is not more than 100%.

2. The interpolymer of claim 1 wherein component (a) is a mixture of fluorinated monomers having predominantly straight-chain perfluoroalkyl groups of 6, 8, and 10 carbon atoms in the approximate weight ratio of 3:2:1, and the components (c) and (d) comprise an equiweight mixture of 2-hydroxyethyl methacrylate and N-methylolacrylamide, and wherein the inherent viscosity of the polymer as a 0.5% solution in 1,1,2-trichloro-1,2,2-trifluoroethane at 30° C. is from about 0.1 to about 1.2.

3. The interpolymer of claim 2 containing about 75% by weight of the monomer $R_fCH_2CH_2O_2CC(CH_3)=CH_2$, about 25% by weight 2-ethylhexyl methacrylate, about 0.25% by weight 2-hydroxyethyl methacrylate, and about 0.25% by weight N-methylolacrylamide.

4. The interpolymer of claim 2 containing about 85% by weight of the monomer $R_fCH_2CH_2O_2CC(CH_3)=CH_2$, about 15% by weight 2-ethylhexyl methacrylate, about 0.25% by weight 2-hydroxyethyl methacrylate, and about 0.25% by weight N-methylolacrylamide.

5. An aqueous emulsion of the interpolymer of claim 1.

6. A process for treating fibrous materials to impart oil and water repellency thereto which comprises impregnating said fibrous materials with an aqueous emulsion of a fluorinated interpolymer to effect a dry pickup of from 0.1% to 10% of the solids on weight of the fibrous material, drying the material and heating the dried material from about 66° C. to about 195° C. for at least 15 seconds, said interpolymer comprising
   (a) from about 70% to about 95% by weight of units derived from at least one monomer of the formula $R_fCH_2CH_2O_2CC(CH_3)=CH_2$, wherein $R_f$ is a perfluoroalkyl group of from four to fourteen carbon atoms;
   (b) from about 5% to about 30% by weight of units derived from the monomer 2-ethylhexyl methacrylate;
   (c) from about 0.1% to about 1% by weight of units derived from the monomer $$RCH(OH)CH_2O_2CC(R')=CH_2$$

wherein R and R' are each selected from the group consisting of hydrogen and methyl; and
   (d) from 0% to about 0.5% by weight of units derived from the monomer N-methylolacrylamide;
   and wherein the total weight percent of the components of the interpolymer is not more than 100%.

7. The process of claim 6 where component (a) of the interpolymer is a mixture of fluorinated monomers having predominantly straight-chain perfluoroalkyl groups of 6, 8, and 10 carbon atoms in the approximate weight ratio of 3:2:1, and the components (c) and (d) comprise an equiweight mixture of 2-hydroxyethyl methacrylate and N-methylolacrylamide and wherein the inherent viscosity of the polymer as a 0.5% solution in 1,1,2-trichloro-1,2,2-trifluoroethane at 30° C. is from about 0.1 to about 1.2.

8. The process of claim 7 wherein the interpolymer contains about 75% by weight of the monomer $R_fCH_2CH_2O_2CC(CH_3)=CH_2$, about 25% by weight 2-ethylhexyl methacrylate, about 0.25% by weight 2-hydroxyethyl methacrylate, and about 0.25% by weight N-methylolacrylamide.

9. An oil- and water-repellent polymeric composition comprising
 (A) a fluorinated interpolymer having
  (a) from about 70% to about 95% by weight units derived from at least one monomer of the formula $R_fCH_2CH_2O_2CC(CH_3)=CH_2$, wherein $R_f$ is a perfluoroalkyl group of from 4 to 14 carbon atoms;
  (b) from about 5% to about 30% by weight of units derived from the monomer 2-ethylhexyl methacrylate;
  (c) from about 0.1% to about 1% by weight of units derived from the monomer $$RCH(OH)CH_2O_2CC(R')=CH_2$$

wherein R and R' are each selected from the group consisting of hydrogen and methyl; and
  (d) from 0% to about 0.5% by weight of units derived from the monomer N-methylolacrylamide,
 and wherein the total weight percent of the components of the interpolymer is not more than 100%, and
 (B) a polymer prepared from at least one compound selected from the group consisting of (a) polymerizable vinylidene compounds free of nonvinylic fluorine and (b) conjugated dienes,
with the proviso that the composition contains from about 3% to about 60% by weight of the fluorinated monomer $R_fCH_2CH_2O_2CC(CH_3)=CH_2$ in polymerized form.

10. The polymeric composition of claim 9 wherein component (a) of the fluorinated interpolymer (A) is a mixture of fluorinated monomers having predominantly straight-chain perfluoroalkyl groups of 6, 8, and 10 carbons in the approximate weight ratio of 3:2:1, and the components (c) and (d) comprise an equiweight mixture of 2-hydroxyethyl methacrylate and N-methylolacrylamide, and wherein inherent viscosity of the polymer as a 0.5% solution in 1,1,2-trichloro-1,2,2-trifluoroethane at 30° C. is from about 0.1 to about 1.2.

11. The polymeric composition of claim 10 wherein the fluorinated interpolymer contains about 75% by weight of the monomer $R_fCH_2CH_2O_2CC(CH_3)=CH_2$, about 25% by weight 2-ethylhexyl methacrylate, about 0.25% by weight 2-hydroxyethyl methacrylate, and about 0.25% by weight N-methylolacrylamide.

12. The polymeric composition of claim 9 wherein the polymer (B) comprises units derived from 2-ethylhexyl methacrylate and about 2% of N-methylolacrylamide.

13. The polymeric composition of claim 9 wherein polymer (B) comprises units derived from 2-ethylhexyl methacrylate, about 2% of N-methylolacrylamide, and from about 0.001% to about 10% by weight of non-conjugated diene.

14. The polymeric composition of claim 13 wherein the non-conjugated diene is ethylene dimethacrylate.

15. An aqueous emulsion of the polymeric composition of claim 9.

16. The process for treating fibrous materials to impart oil and water repellency thereto which comprises impregnating said fibrous materials with an aqueous emulsion of a polymeric composition to effect a dry pickup of from 0.1% to 10% of solids on the weight of the fibrous material, drying the material and heating the dried material at from about 66° C. to about 195° C. for at least 15 seconds, said polymeric composition comprising
 (A) a fluorinated interpolymer having
  (a) from about 70% to about 95% by weight units derived from at least one monomer of the formula $R_fCH_2CH_2O_2CC(CH_3)=CH_2$, wherein $R_f$ is a perfluoroalkyl group of from 4 to 14 carbon atoms;
  (b) from about 5% to about 30% by weight of units derived from the monomer 2-ethylhexyl methacrylate;
  (c) from about 0.1% to about 1% by weight of units derived from the monomer $$RCH(OH)CH_2O_2CC(R')=CH_2$$

wherein R and R' are each selected from the group consisting of hydrogen and methyl; and
  (d) from 0% to about 0.5% by weight of units derived from the monomer N-methylolacrylamide,
 and wherein the total weight percent of the components of the interpolymer is not more than 100%, and
 (B) a polymer prepared from at least one compound selected from the group consisting of (a) polymerizable vinylidene compounds free of nonvinylic fluorine and (b) conjugated dienes,
with the proviso that the composition contains from about 3% to about 60% by weight of the fluorinated monomer $R_fCH_2CH_2O_2CC(CH_3)=CH_2$ in polymerized form.

17. The process of claim 16 wherein the component (a) of the interpolymer (A) is a mixture of fluorinated monomers having predominantly straight-chain perfluoroalkyl groups of 6, 8, and 10 carbons in the approximate weight ratio of 3:2:1, and the components (c) and (d) comprise an equiweight mixture of 2-hydroxyethyl methacrylate and N-methylolacrylamide, and wherein the inherent viscosity of the polymer as a 0.5% solution in 1,1,2-trichloro-1,2,2-trifluoroethane at 30° C. is from about 0.1 to about 1.2.

18. The process of claim 17 wherein the interpolymer (A) contains about 75% by weight of the monomer $R_fCH_2CH_2O_2CC(CH_3)=CH_2$, about 25% by weight 2-ethylhexyl methacrylate, about 0.25% by weight 2-hydroxyethyl methacrylate, and about 0.25% by weight N-methylolacrylamide.

19. The process of claim 16 wherein the polymer (B) comprises units derived from 2-ethylhexyl methacrylate and about 2% of N-methylolacrylamide.

20. The process of claim 16 wherein the polymer (B) comprises units derived from 2-ethylhexyl methacrylate, about 2% of N-methylolacrylamide, and from about 0.001% to about 10% by weight of non-conjugated diene.

21. The process of claim 20 wherein the non-conjugated diene is ethylene dimethacrylate.

References Cited
UNITED STATES PATENTS

| | | | |
|---|---|---|---|
| 3,248,260 | 4/1966 | Langerak et al. | 117—143 X |
| 3,256,230 | 6/1966 | Johnson et al. | 260—900 X |
| 3,282,905 | 11/1966 | Fasick et al. | 117—121 X |
| 3,277,039 | 10/1966 | Marascia et al. | 260—900 X |
| 3,356,628 | 12/1967 | Smith et al. | 260—29.6 |

WILLIAM D. MARTIN, Primary Examiner

THEODORE G. DAVIS, Assistant Examiner

U.S. Cl. X.R.

117—121, 126, 135.5, 138.8, 142, 143, 155; 260—29.6, 80.73, 80.75, 900